United States Patent [19]

Mori

[11] Patent Number: 4,740,048

[45] Date of Patent: Apr. 26, 1988

[54] LIGHT RADIATOR

[76] Inventor: Kei Mori, 3-16-3-501, Kaminoge, Setagaya-ku, Tokyo, Japan

[21] Appl. No.: 828,102

[22] Filed: Feb. 10, 1986

[30] Foreign Application Priority Data

Aug. 9, 1985 [JP] Japan .................... 60-175286

[51] Int. Cl.⁴ .................................. G02B 6/36
[52] U.S. Cl. ........................ 350/96.15; 362/32; 350/96.10; 350/96.20
[58] Field of Search ............. 350/96.10, 96.15, 96.18, 350/96.19, 96.20, 258-265; 362/32

Primary Examiner—William L. Sikes
Assistant Examiner—Akm E. Ullah
Attorney, Agent, or Firm—Jordan and Hamburg

[57] ABSTRACT

A light radiator unitarily comprising a movable light source corresponding to the direct solar rays and a fixed light source corresponding to the indirect solar rays. The light radiator comprises a transparent inner cylinder, a transparent outer cylinder accommodating the inner cylinder, and a light source device for guiding approximately parallel light rays into the inner cylinder and the outer cylinder from at least one end portion thereof. The inner cylinder contains therein dispersedly at a predetermined distance transparent bodies or semi-transparent bodies for reflecting the light rays guided into the inner cylinder from the end portion thereof. A runner having a reflection surface for reflecting the light rays guided from the end portion is provided in a space between the inner cylinder and the outer cylinder. The runner is moved in the space therebetween along an axial direction thereof, and the light rays reflected on the reflection surface of the runner are reflected in the same direction as that of the light rays reflected on the transparent plate or the semitransparent plate in the inner cylinder.

19 Claims, 3 Drawing Sheets

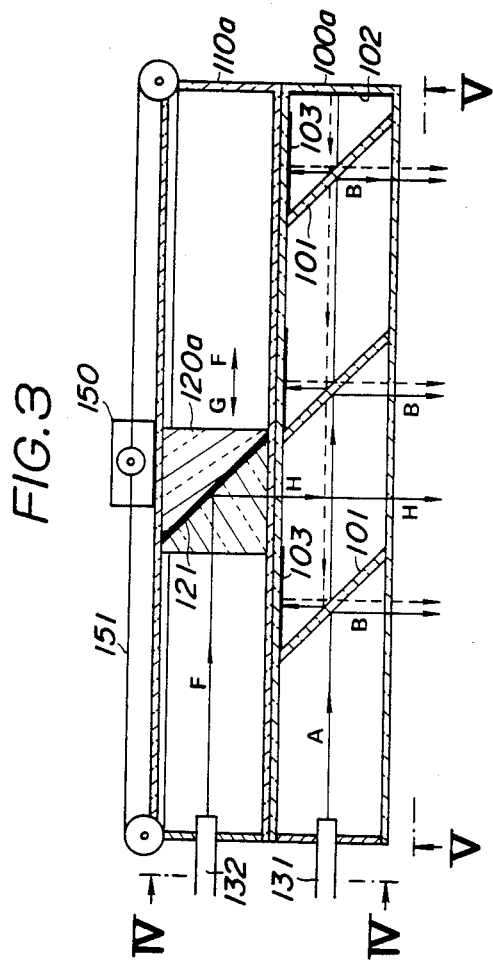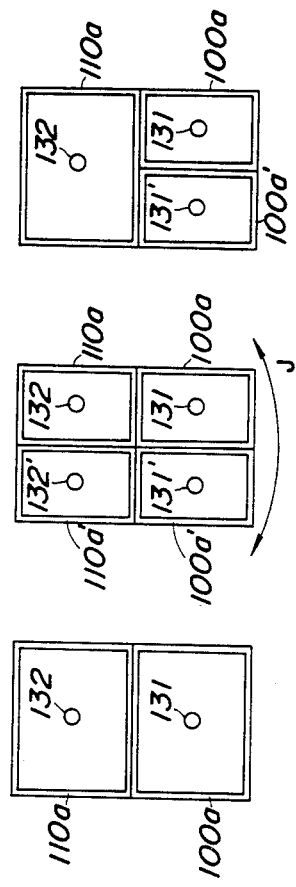

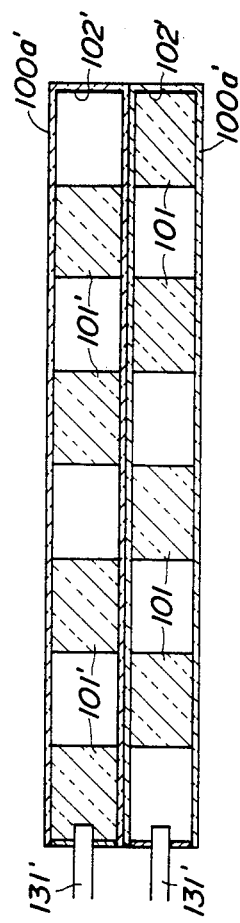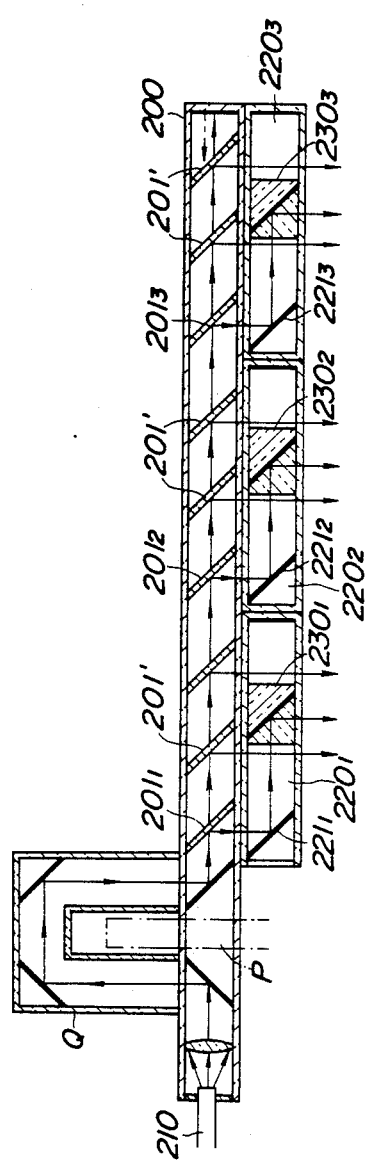

LIGHT RADIATOR

BACKGROUND OF THE INVENTION

The present invention relates to a light radiator, in particular, a light radiator unitarily comprising a movable light source corresponding to the direct solar rays transmitted directly and a fixed light source corresponding to the indirect solar rays.

The present applicant has previously proposed various ways to focus solar rays or artificial light rays by use of lenses or the like, to guide the same into an optical conductor cable, and thereby to transmit them onto an optional desired place through the optical conductor cable. The solar rays or the artificial light rays transmitted and emitted in such a way are employed for photosynthesis and for use in illuminating or for other like purposes, for example, to promote the cultivation of plants.

However, in the case of utilizing the light energy for cultivating plants as mentioned above, the light rays transmitted through the optical conductor cable has directional characteristics. Supposing that the end portion of the optical conductor cable is cut off and the light rays are emitted therefrom, the radiation angle for the focused light rays is, in general, equal to approximately 46°. That is quite a narrow field. In the case of utilizing the light energy as described above, it is impossible to perform a desirable amount of illumination by simply cutting off the end portion of the optical conductor cable and by causing the light rays to emit therefrom.

Therefore, the present applicant has already proposed various kinds of light radiators capable of effectively diffusing the light rays which have been transmitted through an optical conductor cable and radiating the same for illumination over a desired area.

SUMMARY OF THE INVENTION

It is an object of the present invention to provide a light radiator capable of effectively emitting solar rays or artificial light rays which were transmitted through an optical conductor cable outside the same for nurturing plants.

It is another object of the present invention to provide a light radiator capable of effectively moving the optical means installed in a transparent cylinder.

It is another object of the present invention to provide a light radiator capable of effectively diffusing the light rays.

It is another object of the present invention to provide a light radiator capable of obtaining at the same time a movable light source corresponding to the direct solar rays and a fixed light source corresponding to the indirect solar rays.

The above-mentioned features and other advantages of the present invention will be apparent from the following detailed description which goes with the accompanying drawings.

BRIEF DESCRIPTION OF THE DRAWINGS

FIG. 3 is a cross-sectional construction side view for explaining another embodiment of the same;

FIGS. 4A, 4B, 4C are cross-sectional views taken along the line IV—IV of FIG. 3;

FIG. 5 is a bottom surface view of other embodiments shown in FIGS. 4B and 4C (a view as seen along the line V—V of FIG. 3);

FIG. 6 is a cross-sectional construction side view for explaining other embodiment of the present invention;

DESCRIPTION OF THE PREFERRED EMBODIMENTS

Figure 1:
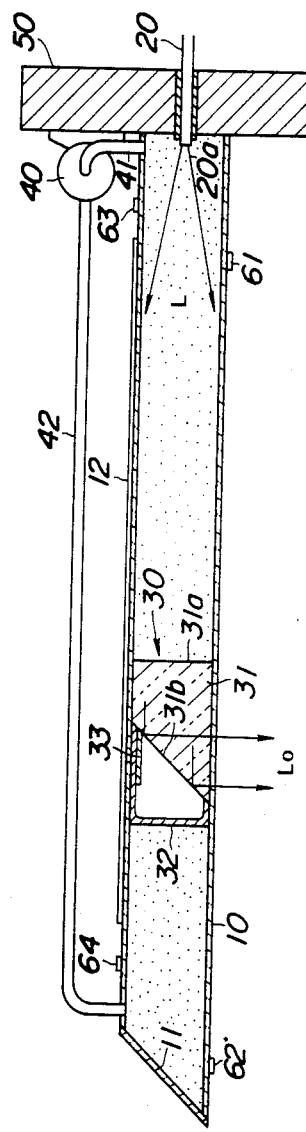
FIG. 1 is a cross-sectional construction side view for explaining an embodiment of a light radiator which has been previously proposed by the present applicant.

FIG. 1 is a cross-sectional construction side view for explaining an embodiment of a light radiator which has been previously proposed by the present applicant. In FIG. 1, 10 is a transparent cylinder, 20 an optical conductor, 30 optical means, 40 a liquid pump, and 50 a foundation.

The cylinder 10 is filled with water or optical oil. And, a light emitting end 20a of the optical conductor 20 is situated at one end portion of the cylinder 10. The light rays transmitted through the optical conductor 20 are emitted into the cylinder 10 from the light emitting end 20a of the optical conductor 20 and propagate toward another end portion of the cylinder 10 while being reflected on the inner wall surface and the outer wall surface of the cylinder 10.

As a matter of course, the light rays emitted from the optical conductor 20 may be converted to parallel light rays by the lenses or the like and the converted parallel light rays may be transmitted through the cylinder 10. (In practice, it is so difficult to get completely parallel light rays that approximately parallel light rays are employed.)

A transparent cylindrical optical means 30 is slidably installed in the cylinder 10. One end surface of the optical means, that is, the surface 31a at the light receiving side is formed in a state of plane not inclined while another opposite end surface 31b is formed in a state of inclined plane. This optical means 30 comprises of a cylindrical optical conductor 31 having one end surface 31a for receiving the light rays formed in a state of plane not inclined and another opposite end surface 31b formed in a state of inclined plane, and a cover member 32 forming an air chamber at the side of the inclined surface 31b by tightly closing the optical conductor 31 at the side of 31b.

Consequently, the light rays L guided into the cylinder 10 as mentioned above enter the optical means 30 from the plane 31a of the optical conductor 31. Further, the light rays L are reflected on the inclined surface 31b at the opposite side of the optical conductor 31 and the reflected light rays Lo are discharged outside of the cylinder 10. Plants or the like are cultivated outside of the cylinder. The light rays emitted from the cylinder 10 as mentioned before are supplied to the plants as a photo-synthesis reaction light source.

An opening end of the pipe 41 is connected with one end portion of the cylinder 10 and an opening end of the pipe 42 is connected with another end portion of the cylinder 10. By means of those pipes 41 and 42, a differential pressure between the right side and the left side of the optical means 30 is applied to the optical means 30. Therefore, the optical means 30 can be moved left and right in the cylinder 10 by the action of the differential pressure. In such a manner, the light rays can be supplied to the plants.

The numerals 61 and 62 represent photo sensors mounted on the outer circumferential surface of the cylinder 10 at the side, through which the light rays reflected by the optical means 30 pass. The photo sensor 61 detects an arrival of the optical means 30 at the right end of the cylinder 10, and the detection signal generated therefrom controls the liquid pump 40 so as to supply the differential pressure to the optical means 30 and move it leftward. On the other hand, the photo sensor 62 detects an arrival of the optical means 30 at the left end of the cylinder 10, and the detection signal generated therefrom controls the liquid pump so as to supply the differential pressure to the optical means 30 and move it rightward.

Those photo sensors 61 and 62 are constructed in such a manner that the sensors can be attached to and removed from the cylinder 10 or moved along the same. Such a construction enables that, when the plants are small, the photo sensors 61 and 62 are installed at a small distance therebetween, and when the trees grow up, the distance between the photo sensors 61 and 62 is enlarged. Therefore, the light rays transmitted from the optical conductor 20 can be effectively supplied to the plants.

The numeral 11 represents a reflection surface formed at the left end side of the above-mentioned cylinder 10. The light rays passing through the optical means 30 and leaking leftward from the cylinder 10 are reflected on the reflection surface 11 and emitted outside of the cylinder 10. The numeral 33 represents a permanent magnet or magnetic substance installed at a position where the light rays reflected on the reflection surface 31b of the outer circumferential surface of the optical means 30 are not prevented from passing therethrough. When such a permanent magnet or magnetic substance 33 is unitarily mounted on the optical means 30, the location of the optical means can be detected by sensing the location of the permanent magnet or magnetic substance 33. On that occasion, magnetic sensors 63 and 64 are employed instead of the photo sensors 61 and 62.

Moreover, the position signal detected by the magnetic sensors 63 and 64 is employed in order to control the liquid pump 40 as is the case of the afore-mentioned photo sensors and numeral 12 represents a permanent magnet or magnetic substance installed on the outer surface of the cylinder 10 so as to elongate along the axis of the cylinder 10. The optical means 30 is so arranged as to turn to a desired direction by use of the permanent magnet or magnetic substance 12.

And further, the afore-mentioned light radiator creates a moveable light source by use of the optical means 30 and the light rays emitted from the movable light source are supplied to the plants. However, in order to effectively cultivate the plants, a fixed light source of approximately constant light intensity corresponding to the indirect solar rays needs to be provided in addition to the above-mentioned movable light source corresponding to the direct solar rays of more amount than the necessary minimum amount required for maintaining a living body of the plants can be obtained by use of the indirect solar rays.

Figure 2:
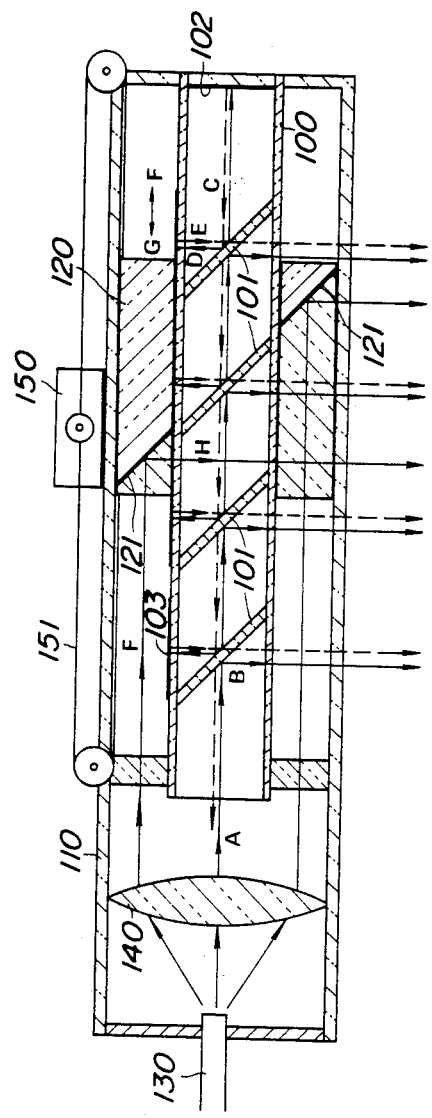
FIG. 2 is a cross-sectional construction side view for explaining an embodiment of a light radiator according to the present invention.

FIG. 2 is a cross-sectional construction side view for explaining an embodiment of a light radiator according to the present invention. In FIG. 2, 100 is a transparent inner cylinder and 110 is a transparent outer cylinder. The cylinders 100 and 110 are installed coaxially as a double tube. In the inner cylinder 100, transparent plates or semitransparent plates 101 having a surface inclined by approximately 45° are arranged dispersedly at a predetermined distance. A cylindrical runner 120 having a reflection surface 121 inclined by approximately 45° is installed in a space between the inner cylinder 100 and the outer cylinder 110.

The numeral 130 represents an optical conductor cable. The end portion not shown in FIG. 2 of the optical conductor cable 130 is connected with a solar ray collecting device or the artificial light ray collecting device which has been already proposed in various ways by the present applicant. In the solar ray collecting device or the artificial light ray collecting device, the solar rays or the artificial light rays collected by the lens or the like are guided into the optical conductor cable 130 and transmitted therethrough.

The light rays transmitted through the optical conductor cable 130 are converted to parallel light rays by use of a lens 140 or the like. (Since it is difficult to obtain completely parallel light rays, converted light rays are approximately parallel ones in practice.) A part of the parallel light rays is guided into the inner cylinder 100 and propagates in the inner cylinder 100 in the direction A. During the time of propagation, the light rays are reflected in the direction B perpendicular thereto by use of the respective transparent or semitransparent plates 101 and discharged through the transparent walls of the inner cylinder 100 and the outer cylinder 110 outside thereof.

The end surface 102 of the inner cylinder 100 is constructed to have a reflection surface. The light rays passing through the respective transparent plates or semitransparent plates 101 as mentioned above are reflected on the reflection surface 102. At this time, the reflected light rays propagate in the direction C opposite to the direction mentioned before. And then, the light rays pass through the respective transparent plates or semitransparent plates 101 from the direction C. On that occasion, a part of the light rays is reflected on the respective transparent plates or semitransparent plates and directed to in direction shown by the arrow D.

However, a reflection film 103 for reflecting the light rays reflected as mentioned before is formed on a part of the inner wall or the outer wall of the inner cylinder 100, and the light rays reflected on the respective transparent plates or semitransparent plates and directed in the direction shown by the arrow D are reflected on the reflection film 103 and directed in the direction shown by the arrow E, and further the reflected light rays are superposed on the afore-mentioned light rays directed in the direction shown by the arrow B and discharged outside of the cylinders 100 and 110.

At this time, whenever the light rays propagating in the direction A pass through the transparent plates or the semitransparent plates 101, the radiation intensity thereof decreases. Consequently, the radiation intensity of the light rays discharged in the direction B decreases in order. And further, whenever the light rays propagating in the direction C pass through the transparent plates or the semitransparent plates 101, the radiation intensity thereof decreases. Therefore, since the radiation intensity of the light rays directed in the direction E decreases, it follows that the light rays of approximately uniform radiation intensity are radiated along the axial direction of the cylinder 100 as a whole.

Furthermore, on that occasion, when the reflection surface 102 is inclined a little, there exists no fear that the light rays reflected on the reflection surface 102 are guided into the optical conductor cable 130 by the lens 140.

On the other hand, a runner 120 is provided in the space between the inner cylinder 100 and the outer cylinder 110. The runner 120 is pulled by means of an optional well-known pulling means 150 just like a motor through the medium of a string, a wire or the like 151 so as to move it along the axial direction shown by the arrow F or G.

The runner 120 has a through-hole of a diameter approximately equal to the outer diameter of the inner cylinder 100 at the central portion thereof and the outer diameter of the runner 120 is approximately equal to the inner diameter of the outer cylinder 110. And further, an inclined reflection surface 121 is formed in the inner part of the runner 120. In such a construction, the runner 120 partly fills the space between the inner cylinder 100 and the outer cylinder 110. A part of the light rays emitted from the optical conductor 130 and converted to parallel light rays by use of the optical means 140 just like lens or the like are radiated into the space between the inner cylinder 100 and the outer cylinder 110 and propagate in the direction F. On the half way, the light rays arrive at the reflection surface 121 of the runner 120 and are reflected thereon and bent in the direction shown by the arrow H approximately perpendicular to the direction F. And further, the light rays pass through the inner cylinder 100 and the outer cylinder 110 and are discharged outside thereof.

In such a manner, since the runner 120 is moved in the direction F or G, the light rays radiated from the reflection surface 121 are also moved along the axial direction of the cylinders 100 and 110. Consequently, the combined light rays consisting of the constant fixed light rays reflected by the transparent or semitransparent plates 101 and the movable light rays reflected on the reflection surface 121 of the runner 120 are radiated from the cylinders 100 and 110.

The plants grow up owing to the fixed light rays corresponding to the indirect solar rays and the moving light rays corresponding to the direct solar rays transmitted directly in the natural world. Normally, a photo synthesis reaction of at least a minimum degree necessary for maintaining the living body of the plants is performed by the indirect solar rays, and another photo synthesis reaction necessary for cultivating the same is performed by the direct solar rays transmitted directly. However, according to the present invention, the light rays corresponding to the indirect solar rays as mentioned above can be obtained by use of the inner cylinder 100 and the light rays corresponding to the direct solar rays transmitted directly can be obtained by use of the runner 120, and thereby the plants can be cultivated more effectively than in the past.

Furthermore, during the night time or in case that the solar rays cannot be employed, or when the solar rays are weak in intensity, the light rays emitted from the artificial light source just like the xenon lamp may be guided into the optical conductor cable 130. In FIG. 2, an embodiment in which a light radiator according to the present invention installed horizontally is employed has been described heretofore. However, it will be easily understood that a light radiator installed vertically may be employed.

FIG. 3 is a cross-sectional construction side view for explaining another embodiment of a light radiator according to the present invention. In FIG. 3, 100a is a lower-side light guiding passage and 110a is a upper-side light guiding passage. The former 100a corresponds to the inner cylinder 100 shown in FIG. 2 and the latter 110a corresponds to the space between the inner cylinder 100 and the outer cylinder 110 shown in FIG. 2, that is, the space in which the runner 120 runs. The transparent or semitransparent plates 101 as illustrated in FIG. 2 are dispersedly arranged at a predetermined distance in the lower-side light guiding passage 100a. The light rays emitted into the light guiding passage 100a from the optical conductor cable 131 are reflected on those transparent or semitransparent plates 101 and discharged in the direction B in such a manner as illustrated in FIG. 2.

On the other hand, a runner 120a as mentioned before is installed in the light guiding passage 110a and moved in the direction F or G by use of the motor 150 and wire 151, etc., and thereby the light rays guided into the optical conductor 110a from the optical conductor cable 132 are reflected by the runner 120a and discharged in the direction H, that is the direction which is the same as the light discharging direction of the light discharging passage 100a.

On that occasion, it will be possible to replace the locations of the light guiding passages 100a and 110a with each other or to arrange those passages 100a and 110a in parallel with each other. And further, the light rays emitted from the artificial light source may be guided into the light guiding passage 100a and the solar rays collected by the solar ray collecting device may be guided into the light guiding passage 110a. In such a manner, the light rays closely resembling those in the natural world can be supplied to the plants or the like.

FIGS. 4A, 4B, 4C are a cross-sectional view taken along the line IV—IV of FIG. 3, and FIGS. 4B and 4C are views for explaining other embodiments of the present invention, respectively, both of which are the cross-sectional views of light radiators seen from the same direction as in the case of FIG. 4A. FIG. 5 is a bottom surface view thereof, that is, a view as seen along the line V—V of FIG. 3 in relation to FIGS. 4A and 4B.

In the embodiment shown in FIG. 4B, a second light guiding passage 100a' in which transparent or semitransparent plates 101' are arranged in a zigzag state against the transparent or semitransparent plates 101 arranged in the light guiding passage 100a as shown in FIGS. 3 and 4A is installed in parallel with the above-mentioned light guiding passage 100a. And further, on the upper side of the second light guiding passage 100a' a second upper-side light guiding passage 110a' is installed in parallel with the light guiding passage 110a, and the upper-side light guiding passage 110a' is provided with a runner 120a' which is moved in the direction opposite to that of the movement of the runner 120a in the light guiding passage 110a. Moreover, those light guiding passages; 100a, 100a', 110a and 110a', are unitarily combined into one and rockingly moved in the direction shown by the arrow J.

In the embodiments shown in FIGS. 2 through 4A, when the runner 120 or 120a moves on the reflection film 103, the light rays reflected by the runner 120 or 120a are intercepted by the reflection film 103, and thereby the direct solar rays transmitted directly cannot be supplied to the plants. However, according to this embodiment as shown in FIG. 4B or FIG. 4C, it will be possible to supply the direct solar rays transmitted directly to the plants or the like at all times. Namely, in FIG. 5, the light rays radiated from the runner are intercepted by the transparent or semitransparent plates 101 or 101'. However, in the case of the embodiments as shown in FIGS. 4B and 4C, when the light rays radiated from the runner are intercepted by those transparent or semitransparent plates in a light guiding passage, the same are discharged in another adjacent light guiding passage. And further, the entire portion of the combined light guiding passages $100a$ and $100a'$ is rockingly moved in a plane perpendicular thereto in the direction shown by the arrow J as shown in FIG. 4B, so that the light rays are supplied to the plants or the like at least at a period of rocking motion thereof.

Moreover, in the embodiment shown in FIG. 4C, the light guiding passages $110a$ and $110a'$ as shown in FIG. 4B are united into one light guiding passage $110a$. The united single light guiding passage $110a$ is commonly used for the light guiding passages $100a$ and $100a'$.

FIG. 6 is a cross-sectional construction side view for explaining other embodiment of the present invention. In FIG. 6, 200 is a first elongated light guiding passage for guiding therein the light rays emitted from the optical conductor cable 210, and $220_1$, $220_2$ and $220_3$ are respectively second light guiding passages arranged in series along the first light guiding passage 200. In the first light guiding passage 200, reflection and passing-through plates $201_1$, $201_2$ and $201_3$ for reflecting and bending a part of the light rays guided into the light guiding passage 200 from the optical conductor cable 210 in a direction perpendicular to the first light guiding passage 200 and causing the remaining part of the light rays to pass therethrough are arranged at a predetermined interval. And further, reflection plates $221_1$, $221_2$ and $221_3$ for receiving respectively the light rays reflected on the reflection and passing-through plates $201_1$, $201_2$ and $201_3$ and causing them to propagate in the second light guiding passages are respectively provided in the second light guiding passages $220_1$, $220_2$ and $220_3$.

Moreover, the afore-mentioned reflection and passing-through plates may be transparent or semitransparent ones, or otherwise a part of the transparent or semitransparent plates' surface may be formed in a state of reflection surface. On that occasion, in the case that the more distant the reflection surface is from the light source side, the larger the square measure of the reflection surface is, the light rays of approximately equal intensity can be reflected on all of the reflection and passing-through plates $201_1$, $201_2$ and $201_3$.

The light rays guided into the first light guiding passage 200 from the optical conductor cable 210 are reflected on the transparent or semitransparent plates $201_1$, $201_2$ and $201_3$ and guided into the second light guiding passages $220_1$, $220_2$ and $220_3$. Next, in the second light guiding passages $220_1$, $220_2$ and $220_3$, the light rays reflected on the reflection plates $221_1$, $221_2$ and $221_3$ propagate respectively along the axis direction of those light guiding passages.

There are provided runners $230_1$, $230_2$ and $230_3$ as mentioned above, respectively, in the second light guiding passages $220_1$, $220_2$ and $220_3$. As mentioned before, the runners are moved in the second light guiding passages $220_1$, $220_2$ and $220_3$. The light rays guided into the second light guiding passages are reflected by the runners respectively and discharged outside of the second light guiding passages in such a manner as mentioned before.

Moreover, in the embodiment shown in FIG. 6, transparent or semitransparent plates 201' are provided in the first light guiding passage 200 between the reflection and passing-through plates $201_1$, $201_2$ and $201_3$, and the right end of the passage 200. The light rays guided into the first light guiding passage 200 are discharged by use of the plates 201' in the same direction as that of light emission to the embodiment shown in FIG. 6, an elongated light guiding passage may be employed as a first one. And further, as shown in FIG. 6, even in case that the light guiding passage cannot be installed linearly at the location P of a pillar or the like, it can be installed by taking a long way around the obstacle P as shown by the portion Q in FIG. 6.

The embodiments in which the light rays are guided into the light guiding passage only from one end portion of the light guiding passage have been described heretofore. However, it will be possible to guide the light rays from another end portion thereof or from both end portions thereof. Otherwise, it will be also possible to guide the light rays from half way of the light guiding passage. Furthermore, only the embodiments in which the light radiator is set up horizontally at the time of employing it have been described heretofore. However, as a matter of course, it will be easily understood that the light radiator can be set up vertically.

As is apparent from the foregoing description, according to the present invention, the light rays corresponding to the direct solar rays transmitted directly and the light rays corresponding to the indirect solar rays can be supplied to the plants at the same time. As a result, the plants can be more effectively cultivated than in the past.

I claim:

1. A light radiator comprising a transparent inner cylinder, a transparent outer cylinder accommodating said inner cylinder, and a light source device for guiding approximately parallel light rays into said inner cylinder and said outer cylinder from at least one end portion thereof, said inner cylinder containing therein spaced transparent plates or semitransparent plates for reflecting said approximately parallel light rays guided into said inner cylinder from said end portion thereof in a direction approximately perpendicular to said inner cylinder and discharging said light rays traversing said inner cylinder and said outer cylinder, a runner having a reflection surface for reflecting said approximately parallel light rays guided from said end portion provided in a space between said inner cylinder and said outer cylinder, said runner being moveable in said space along an axial direction thereof, said light rays reflected on said reflection surface of said runner being reflected in the same direction as that of said light rays reflected on said transparent plates or said semitransparent plates in said inner cylinder and radiated outside of said inner and outer cylinders.

2. A light radiator as defined in claim 1, wherein at least one end portion of said inner cylinder has a reflection surface.

3. A light radiator as defined in claim 1, wherein a wall surface of said inner cylinder located at a position juxtaposed to said transparent plates or said semitransparent plates at a side opposite to the direction of said light radiation in said inner cylinder is formed with a reflection surface.

4. A light radiator as defined in claim 1, wherein said light source device comprises an optical conductor cable and lens and the light rays emitted from an end portion of said optical conductor cable are converted to approximately parallel light rays by means of said lens.

5. A light radiator, comprising a first transparent cylinder, a second transparent cylinder and a light source device for guiding approximately parallel light rays into said first cylinder and said second cylinder from at least one end portion thereof, said first cylinder containing therein spaced transparent plates or semitransparent plates for reflecting said approximately parallel light rays guided into said first cylinder from said end portion thereof in a direction approximately perpendicular to the axial direction of said first cylinder and discharging said light rays outside thereof traversing said first cylinder, said second cylinder containing therein a runner having a reflection surface for reflecting said approximately parallel light rays guided from said end portion, said runner being moveable in said second cylinder along an axial direction thereof, and said light rays reflected on said reflection surface of said runner being reflected in the same direction as that of said light rays reflected on said transparent plates or said semitransparent plates in said first cylinder.

6. A light radiator as defined in claim 5, wherein said first cylinder and said second cylinder are arranged so as to be disposed one upon another in order to superpose said light rays reflected on said transparent plates or said semitransparent plates on said light rays reflected on the reflection surface of said runner.

7. A light radiator as defined in claim 5, wherein said first cylinder and said second cylinder are arranged so as to be disposed side by side in such a manner that said light rays reflected by said transparent plates or said semitransparent plates are parellel with said light rays reflected by the reflection surface of said runner.

8. A light radiator as defined in claim 5, wherein a reflection surface is provided at a portion of said first cylinder.

9. A light radiator as defined in claim 5 wherein a wall surface of said first cylinder located at a postion juxtaposed to said transparent plates or said semitransparent plates at a side opposite to the direction of said light radiation in said first cylinder is formed as a reflection surface.

10. A light radiator as defined in claim 5, wherein said approximately parallel light rays guided into said first cylinder and said approximately parallel light rays guided into said second cylinder are approximately parallel light rays obtained by a common single light source device.

11. A light radiator as defined in claim 5, wherein said approximately parallel light rays guided into said first cylinder and said approximately parallel light rays guided into said second cylinder are respectively approximately parallel light rays obtained by separate and different light source devices.

12. A light radiator as defined in claim 5, wherein said light radiator comprises two parallel cylinders corresponding to said first cylinder, both of which have alternately said transparent plates or said semitransparent plates, said second cylinder being commonly superimposed upon said two parallel cylinders.

13. A light radiator as defined in claim 5, wherein said light radiator comprises two parallel cylinders corresponding to said first cylinder, both of which have alternately said transparent plates or said semitransparent plates, and further comprising separate different cylinders corresponding to said second cylinder for said respective first cylinders, said runners in said separated different cylinders being moved by a common drive means.

14. A light radiator as defined in claim 5, wherein said first and second cylinders are rockingly moved on a plane perpendicular to the axis of said first and second cylinders.

15. A light radiator comprising a first transparent cylinder, and a plurality of second transparent cylinders arranged in series adjacently to said first cylinder and along the axial direction of said first cylinder, said first cylinder having a light source device for guiding therein approximately parallel light rays and a plurality of reflection and passing-through plates arranged in said first cylinder at a predetermined distance for reflecting a part of said approximately parallel light rays guided into said first cylinder in a direction approximately perpendicular to the axial direction of said first cylinder and discharging a part of said light rays outside of said first cylinder and causing the remaining part of said light rays to pass therethrough, said second cylinders having reflection plates for receiving and reflecting the light rays respectively reflected by said reflection and passing-through plates of said first cylinder and transmitting said light rays in said second cylinders in the axial direction thereof and a runner moveable in said second cylinders along an axial direction thereof, said runner having a reflection surface unitarily provided therein for reflecting the light rays transmitted through said second cylinders and discharging the same outside of said second cylinders.

16. A light radiator as defined in claim 15, wherein said reflection and passing-through plates have a part of the surface thereof formed as a reflection surface and another remaining part thereof formed as a passing-through surface.

17. A light radiator as defined in claim 16, wherein the more distant said reflection and passing-through plate is from said light source device, the wider said reflection surface becomes.

18. A light radiator as defined in claim 15, wherein each of said reflection and passing-through plates are transparent plates or semitransparent plates.

19. A light radiator as defined in claim 15, wherein said first cylinder has a transparent plate or a semitransparent plate between said reflection and passing-through plates.

* * * * *